US008955856B2

(12) United States Patent
Guo

(10) Patent No.: US 8,955,856 B2
(45) Date of Patent: Feb. 17, 2015

(54) STROLLER

(71) Applicant: Zheng-Wen Guo, Guangdong (CN)

(72) Inventor: Zheng-Wen Guo, Guangdong (CN)

(73) Assignee: Wonderland Nurserygoods Company Limited, Kwai Chung, N.T., Hong Kong (HK)

( * ) Notice: Subject to any disclaimer, the term of this patent is extended or adjusted under 35 U.S.C. 154(b) by 17 days.

(21) Appl. No.: 13/738,999

(22) Filed: Jan. 11, 2013

(65) Prior Publication Data

US 2013/0277931 A1     Oct. 24, 2013

(30) Foreign Application Priority Data

Apr. 20, 2012 (CN) ...................... 2012 2 0173300 U

(51) Int. Cl.
 *B62B 9/28* (2006.01)
 *B62B 7/00* (2006.01)
(52) U.S. Cl.
 CPC ..................................... *B62B 7/006* (2013.01)
 USPC ..................................... 280/47.38; 280/47.39
(58) Field of Classification Search
 CPC .......... B62B 9/108; B62B 9/142; B62B 7/14; B62B 7/142; B62B 7/145
 USPC .......................................... 280/47.38, 47.39
 See application file for complete search history.

(56) References Cited

U.S. PATENT DOCUMENTS

| | | | | |
|---|---|---|---|---|
| 5,676,386 A * | 10/1997 | Huang | ............................. | 280/30 |
| 5,772,279 A * | 6/1998 | Johnson, Jr. | ................... | 297/130 |
| 5,794,951 A * | 8/1998 | Corley et al. | ................... | 280/30 |
| 5,865,447 A * | 2/1999 | Huang | ............................. | 280/30 |
| 5,947,555 A * | 9/1999 | Welsh et al. | ................... | 297/130 |
| 6,070,890 A * | 6/2000 | Haut et al. | ................. | 280/47.38 |
| 6,286,844 B1 * | 9/2001 | Cone et al. | ................. | 280/47.41 |
| 6,331,032 B1 * | 12/2001 | Haut et al. | ..................... | 297/130 |
| 6,398,233 B1 * | 6/2002 | Liang et al. | ..................... | 280/30 |
| 6,446,990 B1 * | 9/2002 | Nania et al. | ............. | 280/47.371 |
| 6,572,134 B2 * | 6/2003 | Barrett et al. | ................. | 280/650 |
| 6,695,400 B2 * | 2/2004 | Washizuka et al. | ........... | 297/130 |
| 6,702,316 B2 * | 3/2004 | Hsia | ............................. | 280/648 |
| 6,793,280 B2 * | 9/2004 | Washizuka et al. | ........... | 297/130 |
| 6,863,286 B2 * | 3/2005 | Eros et al. | ................. | 280/47.38 |
| 6,923,467 B2 * | 8/2005 | Hsia | ............................. | 280/648 |
| 7,017,921 B2 * | 3/2006 | Eros | ........................... | 280/47.38 |
| 7,032,922 B1 * | 4/2006 | Lan | ............................. | 280/648 |
| 7,370,913 B2 * | 5/2008 | Takamizu et al. | ........ | 297/256.16 |
| 7,431,395 B2 * | 10/2008 | Morgan et al. | ........... | 297/219.12 |

(Continued)

FOREIGN PATENT DOCUMENTS

EP     2 193 974 A2     6/2010

*Primary Examiner* — Jeffrey J Restifo
(74) *Attorney, Agent, or Firm* — Winston Hsu; Scott Margo

(57) ABSTRACT

A stroller for assembling with an infant safety seat having a first engaging portion. The stroller includes a second engaging portion and a covering component. The second engaging portion is for engaging with the first engaging portion; the covering component includes a first portion and a second portion. The first portion is for covering the second engaging portion. The second portion is surrounding the first portion, and the first portion is clamped between the first engaging portion and the second engaging portion the infant safety seat is assembled with the stroller via the first engaging portion being engaged with the second engaging portion. It is not needed to form an opening on the covering component to implement engagement between the stroller and the infant safety seat, so as to solve a problem of fingers of an infant on the stroller being clipped by the opening.

12 Claims, 8 Drawing Sheets

(56) References Cited

U.S. PATENT DOCUMENTS

| | | | |
|---|---|---|---|
| 7,513,512 B2 * | 4/2009 | Yoshie et al. | 280/47.38 |
| 7,681,894 B2 * | 3/2010 | Santamaria | 280/47.38 |
| 7,686,322 B2 * | 3/2010 | Longenecker et al. | 280/642 |
| 7,938,435 B2 * | 5/2011 | Sousa et al. | 280/658 |
| 8,033,555 B2 * | 10/2011 | Mostert et al. | 280/47.38 |
| 8,100,429 B2 * | 1/2012 | Longenecker et al. | 280/642 |
| 8,251,382 B2 * | 8/2012 | Chen et al. | 280/47.41 |
| 8,328,208 B2 * | 12/2012 | Chen | 280/47.38 |
| 8,382,127 B2 * | 2/2013 | Longenecker et al. | 280/47.4 |
| 8,382,150 B2 * | 2/2013 | Williams et al. | 280/648 |
| 8,550,548 B2 * | 10/2013 | Gibbons et al. | 297/184.13 |
| 8,585,075 B2 * | 11/2013 | Zhong | 280/648 |
| 8,651,502 B2 * | 2/2014 | Winterhalter et al. | 280/47.4 |
| 8,657,326 B2 * | 2/2014 | Shaanan et al. | 280/644 |
| 2003/0075903 A1 | 4/2003 | Hsia | |
| 2012/0181830 A1 * | 7/2012 | Gooris | 297/250.1 |

* cited by examiner

STROLLER

BACKGROUND OF THE INVENTION

1. Field of the Invention

The present invention relates to a stroller, and more specifically relates to a stroller capable of preventing an infant's fingers from being clipped.

2. Description of the Prior Art

With progress of society, development of economics and continuous improvement of people's living level, people require large amounts and various kinds of products to meet various needs of people's living. Take an automobile for example, it appears to provide people with extreme convenience in traffic, so that the automobile becomes more and more people's favorite.

It is well known that an infant safety seat is installed inside a car for an infant to sit on a car seat comfortably and safely. That is, the infant safety seat is a kind of the car seat for the infant to sit, and the infant is restrained on the infant safety seat with a restraint device to protect the infant. The most useful function of the infant safety seat is to reduce harm suffered by the infant resulted from the automobile emergency braking or accidental collision. Therefore, the infant safety seat is soon to be accepted by consumers and is growly promoted in the world.

The conventional infant safety seat is designed as a bassinet to meet the posture of the sleeping infant. As people want to carry the infant lying on the infant safety seat to go outside for activities, in order to overcome the fatigue resulted from holding the infant by hands, a stroller for assembling with the infant safety seat is utilized to convey the infant. The infant can sit on the stroller comfortably, and people can carry the infant with the stroller conveniently to overcome the above fatigued problem.

In addition, a covering component is disposed on the stroller, and the covering component blocks engagement between engaging components of the stroller and engaging components of the infant safety seat. For assembling the infant safety seat with the stroller, it needs to form an opening on the covering component to expose the engaging components of the infant safety seat, so that the engaging components of the stroller and the infant safety seat can be engaged with each other through the opening. However, the infant's fingers may be clipped by the engaging components as the fingers insert into the opening. Therefore, it is essential to provide a stroller to solve the above problem.

SUMMARY OF THE INVENTION

A purpose of the present invention is to provide a stroller to implement engagement between the stroller and an infant safety seat, so as to prevent an infant's fingers from being clipped by engaging components through an opening.

In order to achieve the above purpose, the present invention discloses a stroller for assembling with an infant safety seat having a first engaging portion. The stroller comprises a second engaging portion and a covering component. The second engaging portion is for engaging with the first engaging portion; the covering component includes a first portion and a second portion. The first portion is for covering the second engaging portion. The second portion is surrounding the first portion, an elastic coefficient of the first portion is greater than an elastic coefficient of the second portion, and the first portion is clamped between the first engaging portion and the second engaging portion as the infant safety seat is assembled with the stroller via the first engaging portion being engaged with the second engaging portion.

Preferably, the stroller comprises an assembly chamber for accommodating the infant safety seat, and the second engaging portion and the first portion is disposed at an inner side of the assembly chamber. The assembly chamber is for the first engaging portion to engage with the second engaging portion as the infant safety seat is assembled with the stroller. The first portion is extended to an edge of the assembly chamber, so as to improve ability of resisting damage of the first portion. As a result, it can prevent the first portion from being damaged as the stroller is folded.

Preferably, the assembly chamber has a movement track in response to a procedure of the first engaging portion being engaged with the second engaging portion, and the second engaging portion and the first portion are located on the movement track.

Preferably, the second portion in a position has an opening corresponding to the second engaging portion, and the first portion is fixed to the second portion so as to close the opening. It can ensure that the first portion is clamped between the first engaging portion and the second engaging portion tightly as the first engaging portion is engaged with the second engaging portion.

Preferably, the first portion and the second portion are integrally formed, so as to increase connection strength between the first portion and the second portion.

Preferably, the first portion includes a plurality of elastic material layers, and the plurality of elastic material layers is formed in a multi-layer stack, so that the first portion has better elasticity to prevent from being damaged as the stroller is folded.

Preferably, the first portion is a layered structure made from at least polyethylene terephthalate (PET) and polyurethane (PU), and the layered structure improves elasticity of the first portion and ability of resisting damage of the first portion.

Preferably, the first portion is a layered structure made from at least polyester and spandex.

Preferably, the ratio of the polyester is greater than the ratio of the spandex.

Preferably, the ratio of the polyester is 92%, and the ratio of the spandex is 8%.

Preferably, the second engaging portion is a concave hole, and the first portion covers the concave hole, so that the first portion is pushed into the concave hole more easily.

The covering component of the present invention includes the first portion and the second portion surrounding the first portion. The first portion is clamped between the first engaging portion and the second engaging portion as the infant safety seat is assembled with the stroller via the first engaging portion being engaged with the second engaging portion, so as to achieve a purpose of assembling the stroller with the infant safety seat. Therefore, it is not needed to form an opening on the covering component to implement engagement between the stroller and the infant safety seat, so as to solve a conventional problem of an infant's fingers being clipped by engaging components through the opening. In addition, the elastic coefficient of the first portion can be greater than the elastic coefficient of the second portion, so as to prevent the first portion from being damaged as the stroller is folded or the infant safety seat is assembled with the stroller.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
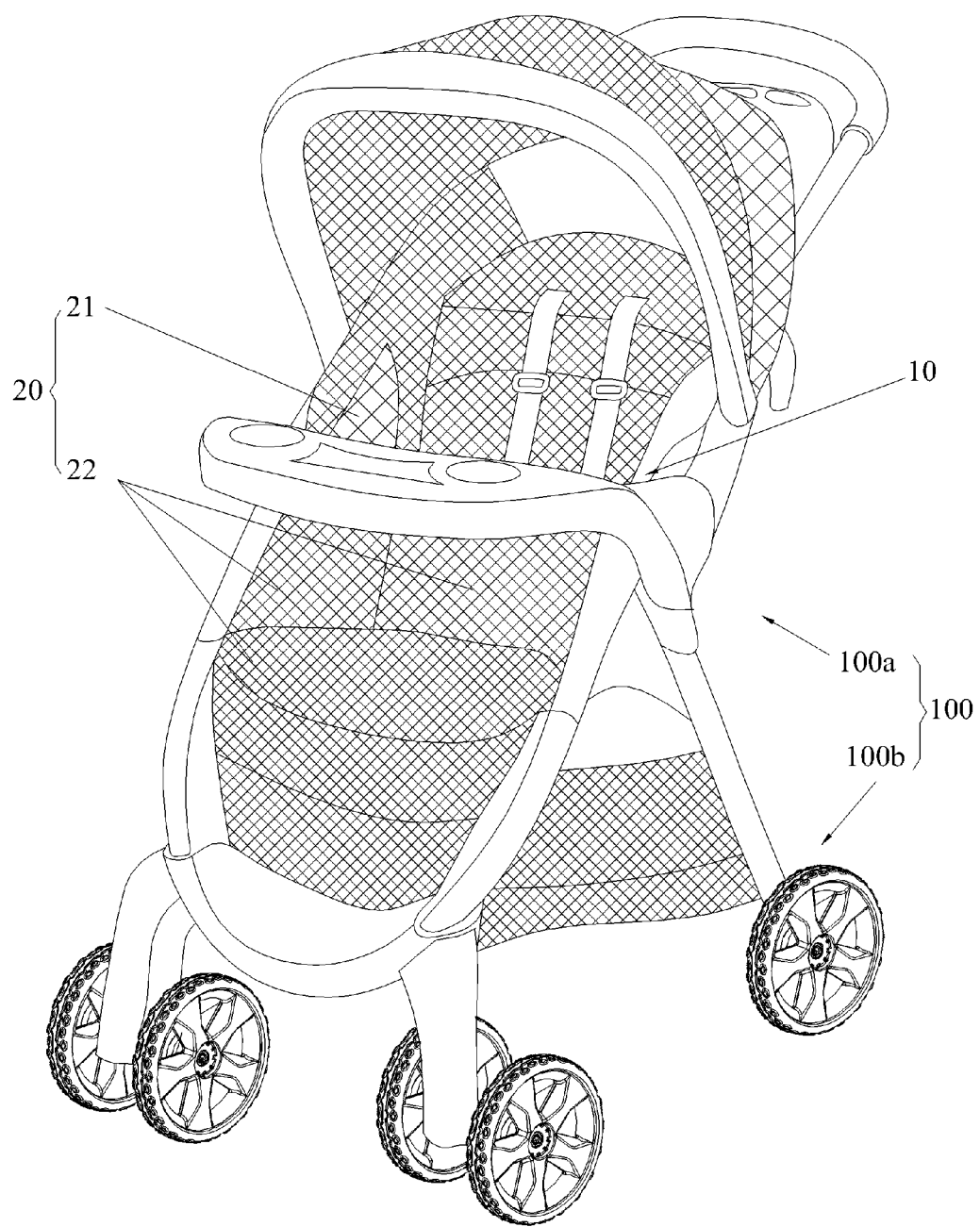
FIG. 1 and FIG. 2 are schematic diagrams of a stroller according to an embodiment of the present invention.
Figure 2:
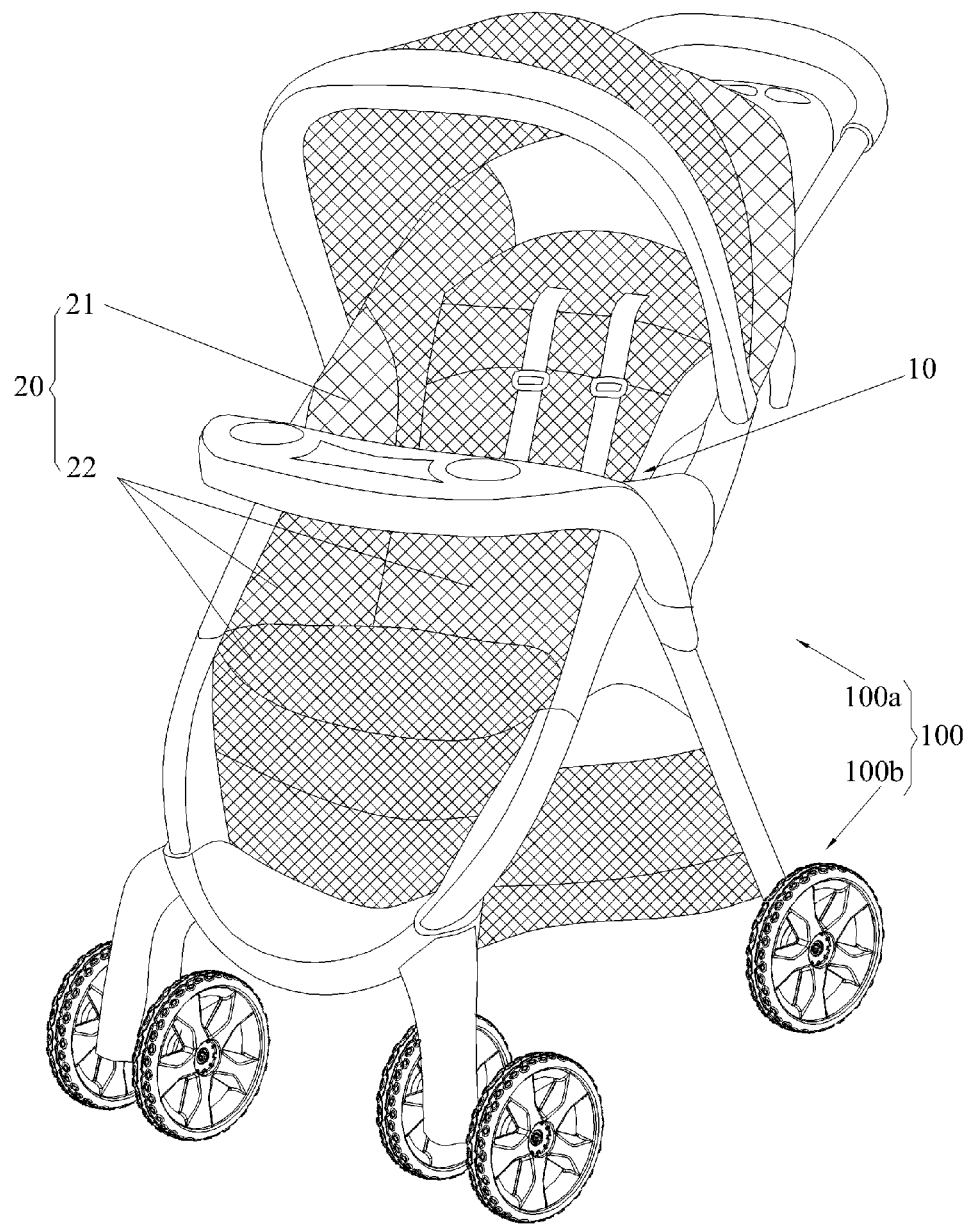
Figure 3:
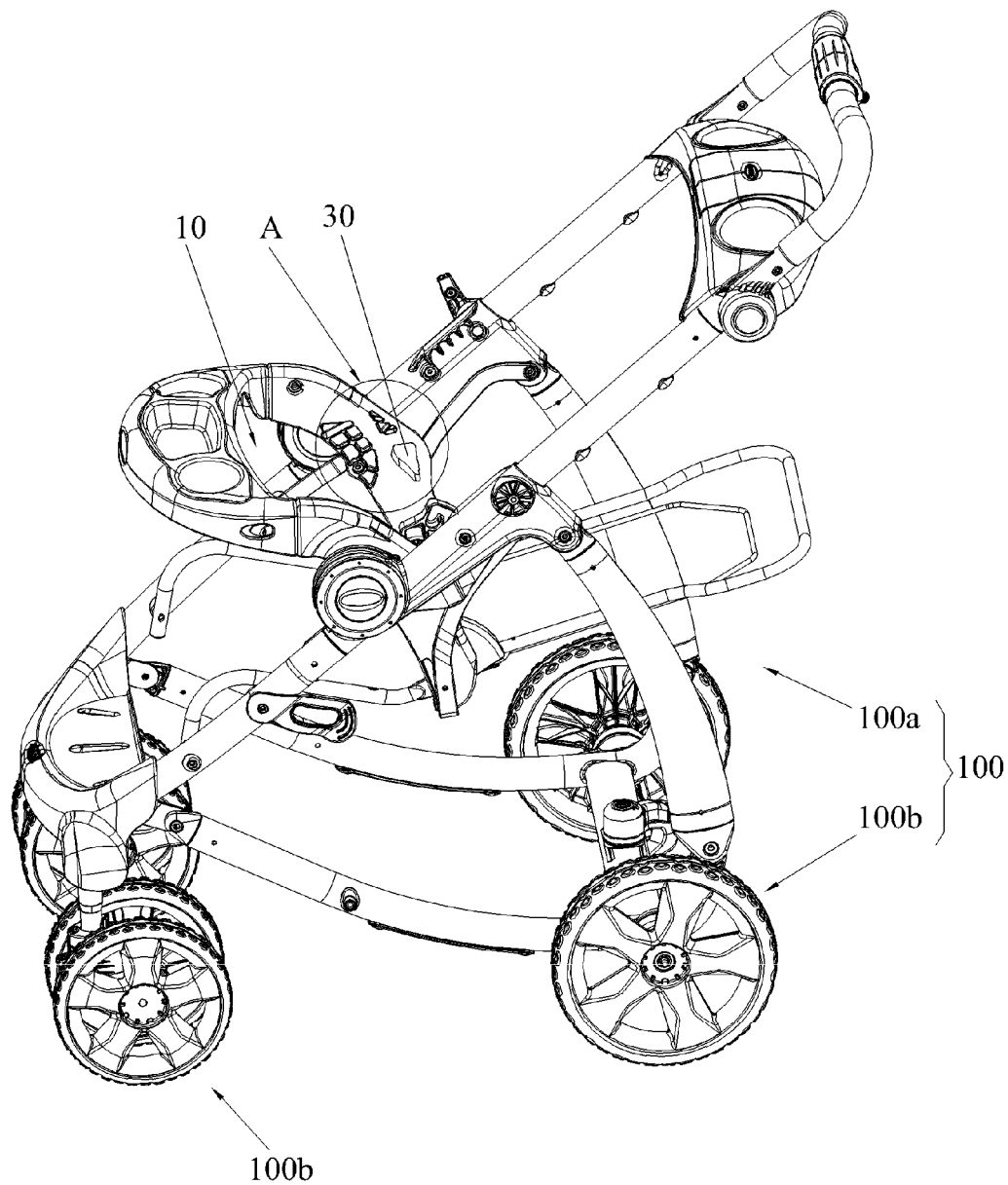
FIG. 3 is a diagram of the stroller without a covering component according to the embodiment of the present invention.
Figure 4:
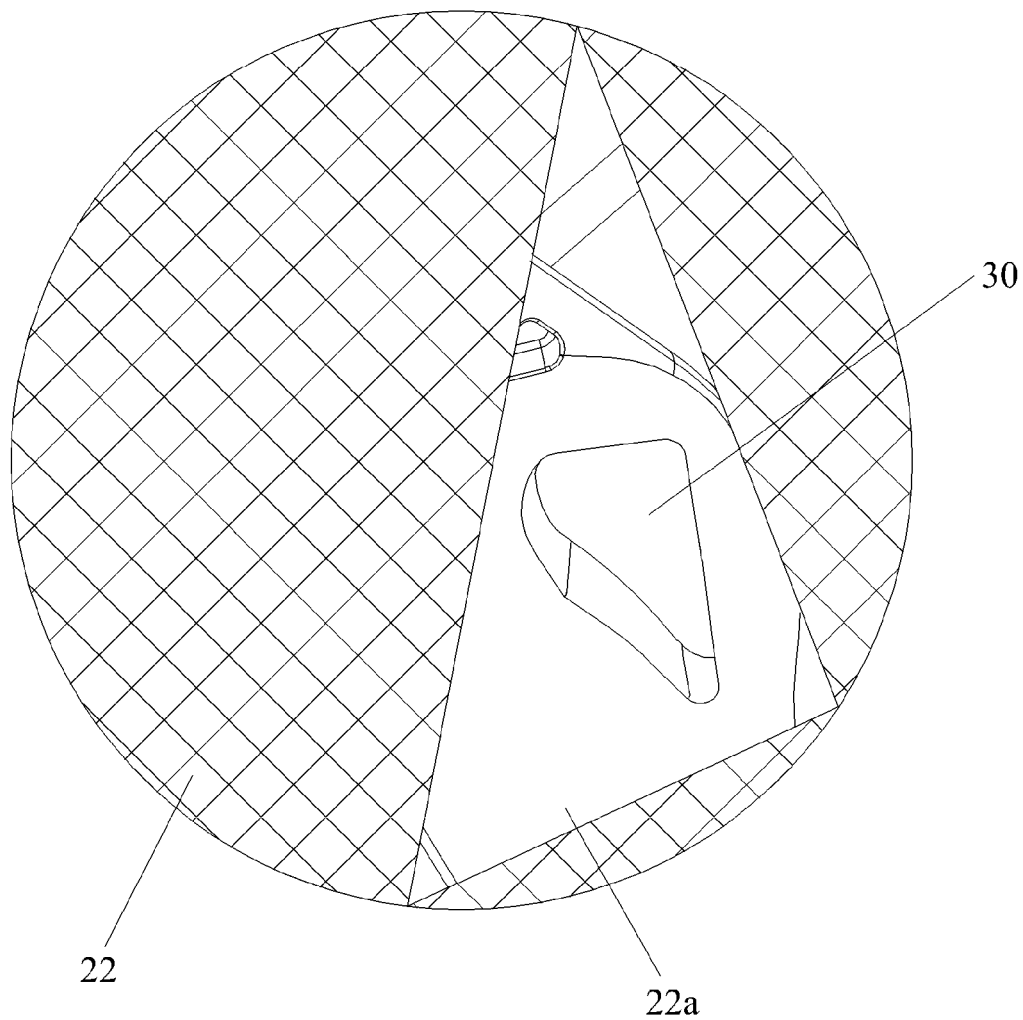
FIG. 4 is a diagram of a second portion covering region A illustrated in FIG. 3 and an opening of the second portion according to the embodiment of the present invention.
Figure 5:
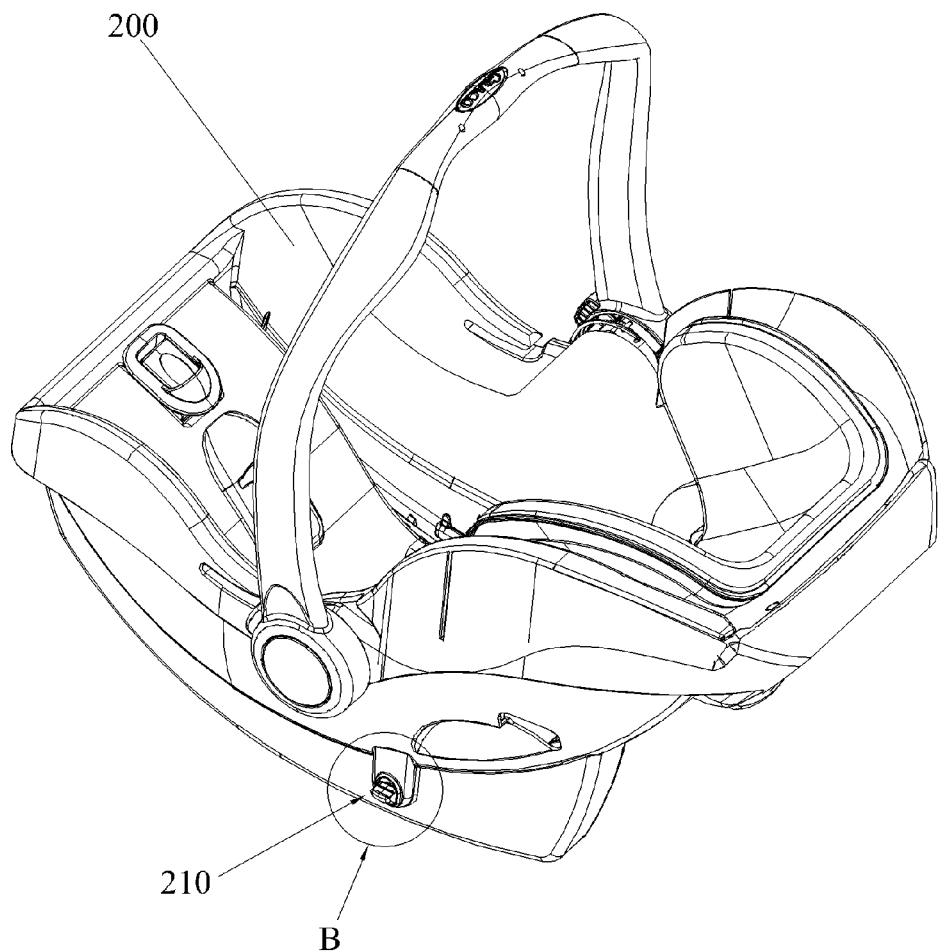
FIG. 5 is a diagram of an infant safety seat according to the embodiment of the present invention.
Figure 6:
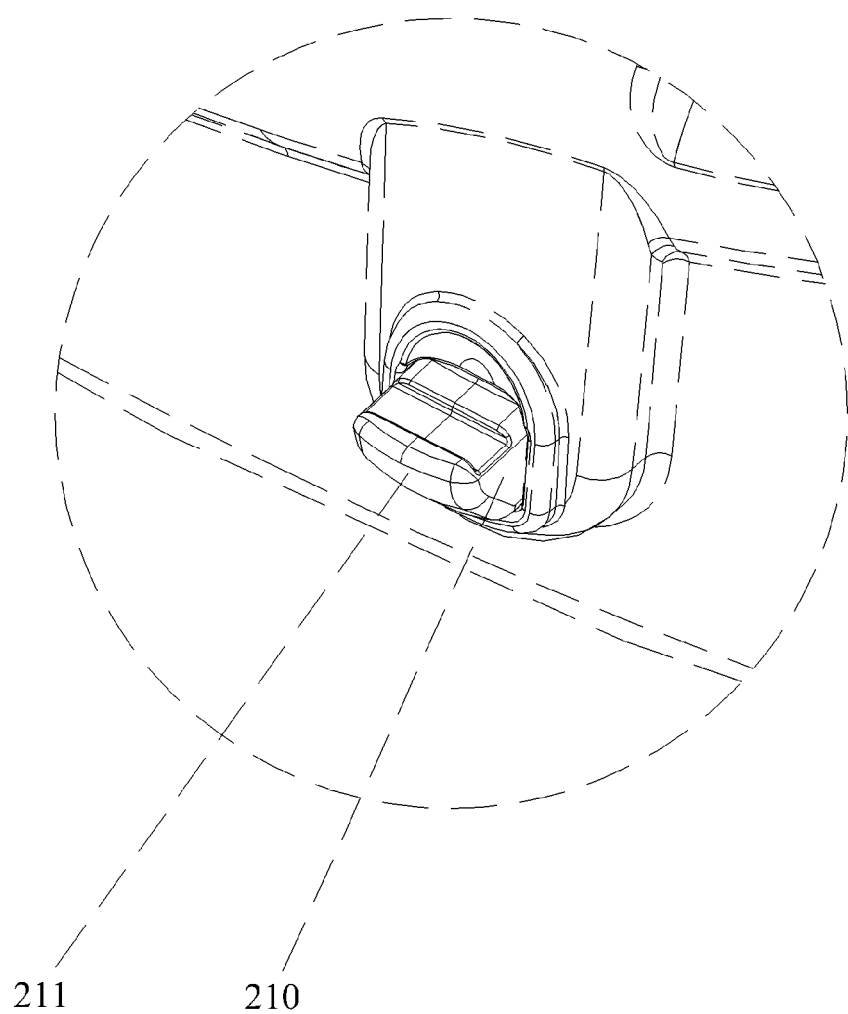
FIG. 6 is an enlarged view of region B illustrated in FIG. 5 according to the embodiment of the present invention.

Please refer to FIG. 1 to FIG. 6. FIG. 1 and FIG. 2 are schematic diagrams of a stroller 100 according to an embodiment of the present invention. FIG. 3 is a diagram of the stroller 100 without a covering component 20 according to the embodiment of the present invention. FIG. 4 is a diagram of a second portion 22 covering region A illustrated in FIG. 3 and an opening 22a of the second portion 22 according to the embodiment of the present invention. FIG. 5 is a diagram of an infant safety seat 200 according to the embodiment of the present invention. FIG. 6 is an enlarged view of region B illustrated in FIG. 5 according to the embodiment of the present invention. The stroller 100 of the present invention can be assembled with the infant safety seat 200 and support the infant safety seat 200 detached from an automobile seat, so that users can utilize the stroller 100 of the present invention to carry an infant to go outside for activities to overcome fatigue resulted from holding the infant by hands for a long time. The stroller 100 includes a frame 100a and wheels 100b pivoted to the frame 100a, so that the stroller 100 of the present invention can move on the ground with the wheels 100b.

The infant safety seat 200 includes a first engaging portion 210. In this embodiment, the first engaging portion 210 can be a protruding portion capable of being retracted elastically on the infant safety seat 200, and an inclined surface 211 is formed on the protruding portion. The stroller 100 of the present invention includes a second engaging portion 30 for engaging with the first engaging portion 210. In this embodiment, the second engaging portion 30 can be a concave hole formed on the frame 100a. The stroller 100 further includes the covering component 20, and the covering component 20 includes a first portion 21 and the second portion 22. The first portion 21 is for covering the second engaging portion 30. The second portion 22 is surrounding the first portion 21, and an elastic coefficient of the first portion 21 is greater than an elastic coefficient of the second portion 22.

As the infant safety seat 200 is assembled with the stroller 100, the first engaging portion 210 is engaged with the second engaging portion 30, so that the first portion 21 is clamped between the first engaging portion 210 and the second engaging portion 30. A procedure of the first portion 21 being clamped between the first engaging portion 210 and the second engaging portion 30 is as follows. As the infant safety seat 200 is disposed on the stroller 100 of the present invention, the moving infant safety seat 200 drives the first engaging portion 210 to move to the second engaging portion 30. Because the first portion 21 of the covering component 20 has elasticity and covers the second engaging portion 30, the moving first engaging portion 210 drives the first portion 21 to extend toward the second engaging portion 30, so that the first portion 21 is clamped between the first engaging portion 210 and the second engaging portion 30.

The stroller 100 of the present invention further includes an assembly chamber 10 for accommodating the infant safety seat 200, and the second engaging portion 30 and the first portion 21 are disposed at an inner side of the assembly chamber 10. In this embodiment, the first portion 21 can be extended to an edge of the assembly chamber 10, so as to improve strain resistance of the first portion 21 to prevent the first portion 21 from being damaged as the stroller 100 is folded. Alternatively, the first portion 21 can be designed not to extend to the edge of the assembly chamber 10 illustrated in FIG. 2, and can be disposed at the inner side of the assembly chamber 10 shown in FIG. 1, so as to decrease the manufacturing cost for price competitiveness in the market.

The assembly chamber 10 is formed on the frame 100a, and the assembly chamber 10 allows the first engaging portion 210 to move to the second engaging portion 30 for engaging with the second engaging portion 30 as the infant safety seat 200 is disposed on the stroller 100. The assembly chamber 10 has a movement track in response to a procedure of the first engaging portion 210 being engaged with the second engaging portion 30, so that the first engaging portion 210 can move with respect to the second engaging portion 30 in a predetermined track. The first portion 21 and the second engaging portion 30 are on the movement track, so that the first portion 21 can cover the second engaging portion 30 reliably, and the first portion 21 is driven by the first engaging portion 210 and the second engaging portion 30 to extend to be clamped between the first engaging portion 210 and the second engaging portion 30 as the first engaging portion 210 is engaged with the second engaging portion 30.

In addition, as shown in FIG. 4, the second portion 22 has the opening 22a in a position corresponding to the second engaging portion 30. The opening 22a is surrounding the second engaging portion 30 so as to expose the second engaging portion 30. The first portion 21 can be fixed to the second portion 22 around the opening 22a with a sewing process, so that the first portion 21 can close the opening 22a of the second portion 22. The way of fixing the first portion 21 on the second portion 22 is not limited to the sewing process, and it depends on actual demand. For example, the first portion 21 and the second portion 22 can be integrally formed, so as to increase connection strength of the first portion 21 and the second portion 22, and to ensure that the first portion 21 is clamped between the first engaging portion 210 and the second engaging portion 30 tightly as the first engaging portion 210 is engaged with the second engaging portion 30.

Furthermore, the first portion 21 can include a plurality of elastic material layers, and the plurality of elastic material layers is formed in a multi-layer stack, so that the first portion 21 has enhanced elasticity to prevent from being damaged as the stroller 100 is folded or the infant safety seat 200 is assembled with the stroller 100. In order to enhance damage resistance of the first portion 21, the first portion 21 can be designed in a triangle shape. The first portion 21 also can be designed in other shapes. The first portion 21 can be a layered structure made from at least polyethylene terephthalate (PET) and polyurethane (PU), and the layered structure improves elasticity and damage resistance of the first portion 21. A portion of PET of the first portion 21 can be more than a portion of PU of the first portion 21. In this embodiment, the first portion 21 can have considerable ratio of PET, so that the first portion 21 has excellent physical and mechanical properties. The ratio of PET can be 92%, and the ratio of PU can be 8%, so that the first portion 21 meets requirements of better physical and mechanical properties. The ratios of PET and PU are not limited to this embodiment. Furthermore, the first portion 21 can also be a layered structure made from at least polyester and spandex. The ratio of the polyester can be greater than the ratio of the spandex. For example, the ratio of the polyester can be 92%, and the ratio of the spandex can be 8%, so that the first portion 21 meets requirements of better physical and mechanical properties. The ratios of polyester and spandex are not limited to this embodiment.

Figure 7:
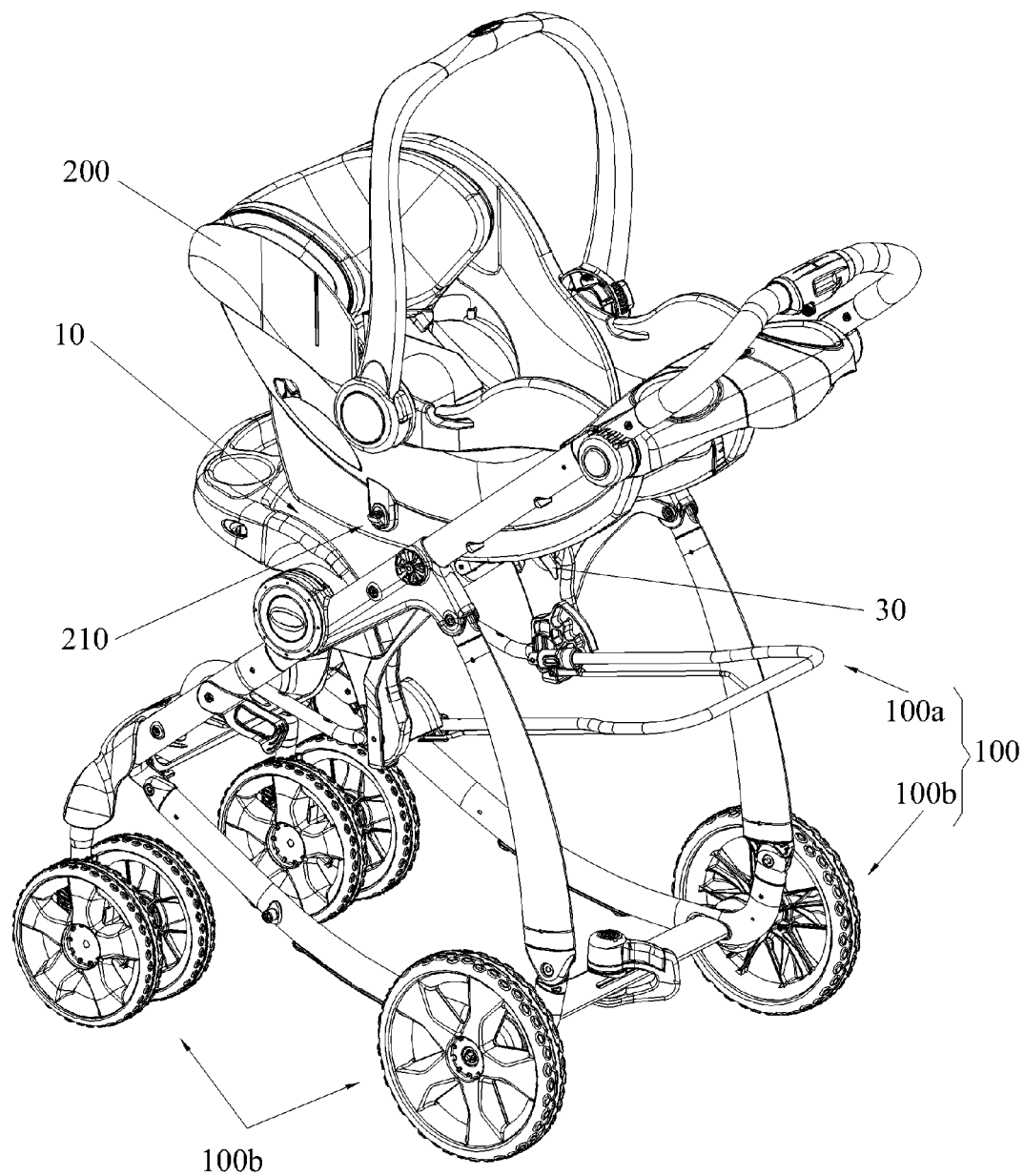
FIG. 7 is a diagram of the infant safety seat being not engaged with the stroller without the covering component according to the embodiment of the present invention.
Figure 8:
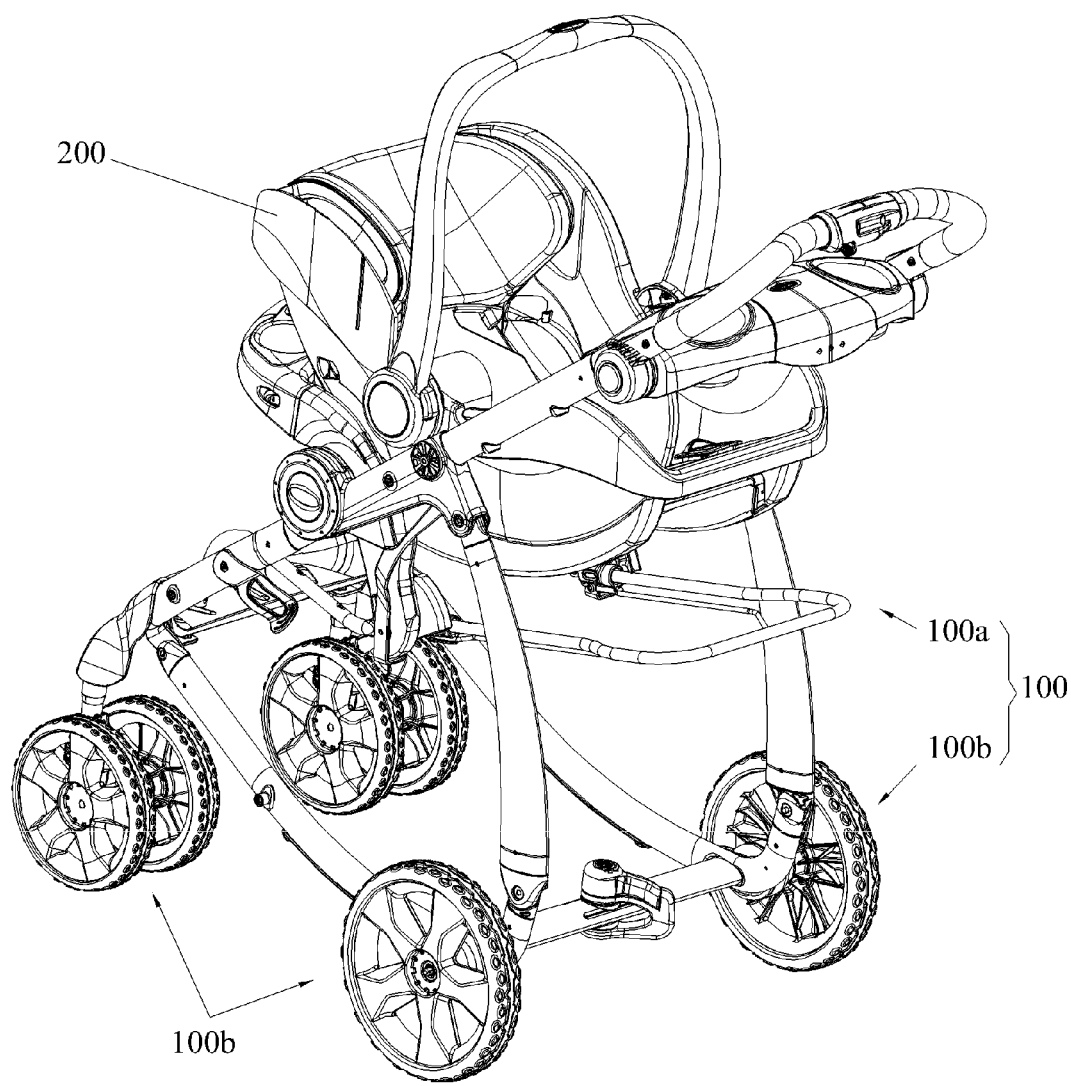
FIG. 8 is a diagram of the infant safety seat being engaged with the stroller without the covering component according to the embodiment of the present invention.

Please refer to FIG. 7 and FIG. 8. FIG. 7 is a diagram of the infant safety seat 200 being not engaged with the stroller 100 without the covering component 20 according to the embodiment of the present invention. FIG. 8 is a diagram of the infant safety seat 200 being engaged with the stroller 100 without the covering component 20 according to the embodiment of the present invention. For engagement, the infant safety seat 200 is disposed inside the assembly chamber 10 as shown in FIG. 7. At this time, the first engaging portion 210 moves to the second engaging portion 30. Because the first portion 21 has elasticity and covers the second engaging portion 30, the moving first engaging portion 210 drives the first portion 21 to extend toward the second engaging portion 30, so that the first portion 21 is engaged into the second engaging portion 30 with the first engaging portion 210. At this time, the first portion 21 is clamped between the first engaging portion 210 and the second engaging portion 30, so as to achieve a purpose of the infant safety seat 200 engaged with the stroller 100 as shown in FIG. 8.

In contrast to the prior art, the covering component 20 of the present invention includes the first portion 21 and the second portion 22 surrounding the first portion 21. The first portion 21 is clamped between the first engaging portion 210 and the second engaging portion 30 as the infant safety seat 200 is assembled with the stroller 100 via the first engaging portion 210 being engaged with the second engaging portion 30, so as to achieve a purpose of assembling the stroller 100 with the infant safety seat 200. Therefore, it is not needed to form an opening on the covering component 20 to implement engagement between the stroller 100 and the infant safety seat 200, so as to solve a conventional problem of an infant's fingers being clipped by engaging components through the opening. In addition, the elastic coefficient of the first portion 21 can be greater than the elastic coefficient of the second portion 22, so as to prevent the first portion 21 from being damaged as the stroller 100 is folded or the infant safety seat 200 is assembled with the stroller 100.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stroller for assembling with an infant safety seat having a first engaging portion, the stroller comprising:
    a second engaging portion for engaging with the first engaging portion; and
    a covering component including:
        a first portion for covering the second engaging portion; and
        a second portion surrounding the first portion, an elastic coefficient of the first portion being greater than an elastic coefficient of the second portion,
    wherein the first portion is clamped between the first engaging portion and the second engaging portion as the infant safety seat is assembled with the stroller via the first engaging portion being engaged with the second engaging portion.

2. The stroller of claim 1, further comprising an assembly chamber for accommodating the infant safety seat, and the second engaging portion and the first portion being disposed at an inner side of the assembly chamber.

3. The stroller of claim 2, wherein the first portion is extended to an edge of the assembly chamber.

4. The stroller of claim 2, wherein the assembly chamber has a movement track in response to a procedure of the first engaging portion being engaged with the second engaging portion, and the second engaging portion and the first portion are located on the movement track.

5. The stroller of claim 1, wherein the second portion has an opening corresponding to the second engaging portion, and the first portion is fixed to the second portion so as to close the opening.

6. The stroller of claim 1, wherein the first portion and the second portion are integrally formed.

7. The stroller of claim 1, wherein the first portion includes a plurality of elastic material layers, and the plurality of elastic material layers is formed in a multi-layer stack.

8. The stroller of claim 1, wherein the first portion is a layered structure made from at least polyethylene terephthalate (PET) and polyurethane (PU).

9. The stroller of claim 1, wherein the first portion is a layered structure made from at least polyester and spandex.

10. The stroller of claim 9, wherein the ratio of the polyester is greater than the ratio of the spandex.

11. The stroller of claim 10, wherein the ratio of the polyester is 92%, and the ratio of the spandex is 8%.

12. The stroller of claim 1, wherein the second engaging portion is a concave hole, and the first portion covers the concave hole.

* * * * *